United States Patent
Naruse

(10) Patent No.: US 8,760,718 B2
(45) Date of Patent: Jun. 24, 2014

(54) IMAGE PRINTER FOR CHANGING A TONE OF AN ORIGINAL IMAGE BASED ON ASSOCIATED IDENTIFICATION INFORMATION AND PRINTING THE IMAGE DATA HAVING THE CHANGED TONE, AND CORRESPONDING IMAGE PRINTING METHOD AND RECORDING MEDIUM

(75) Inventor: Kenichi Naruse, Koganei (JP)

(73) Assignee: Casio Computer Co., Ltd., Tokyo (JP)

( * ) Notice: Subject to any disclaimer, the term of this patent is extended or adjusted under 35 U.S.C. 154(b) by 133 days.

(21) Appl. No.: 13/445,209

(22) Filed: Apr. 12, 2012

(65) Prior Publication Data
US 2012/0262741 A1    Oct. 18, 2012

(30) Foreign Application Priority Data
Apr. 13, 2011   (JP) ................ 2011-088707

(51) Int. Cl.
*G06F 15/00*    (2006.01)
(52) U.S. Cl.
USPC .......................................... 358/1.9
(58) Field of Classification Search
USPC ......................... 358/1.9, 540, 1.18
See application file for complete search history.

(56) References Cited

U.S. PATENT DOCUMENTS

| | | | | |
|---|---|---|---|---|
| 5,621,868 A | * | 4/1997 | Mizutani et al. | 345/595 |
| 6,785,019 B2 | * | 8/2004 | Anderson et al. | 358/1.9 |
| 7,372,597 B2 | * | 5/2008 | Topfer et al. | 358/1.9 |
| 8,031,356 B2 | * | 10/2011 | Cho | 358/1.15 |
| 2002/0051584 A1 | * | 5/2002 | Shimizu et al. | 382/311 |
| 2009/0116074 A1 | * | 5/2009 | Wilsher | 358/3.28 |

FOREIGN PATENT DOCUMENTS

JP    2008-073912 A    4/2008

* cited by examiner

*Primary Examiner* — Barbara Reinier
(74) *Attorney, Agent, or Firm* — Holtz Holtz Goodman & Chick PC

(57) ABSTRACT

An image printer is an image printer including a pictorial tone changing/printing function to change original image data to image data having a different pictorial tone from that of the original data for printing on a printing medium and includes an original image storage unit, an address book storage unit which stores addressee data, an attribute setting unit which sets a pictorial tone changing attribute for changing the original image data to a designated pictorial tone for each piece of the addressee data, an addressee data selection unit, a pictorial tone changing unit which changes the original image data to image data having the pictorial tone associated with the pictorial tone changing attribute, a printing unit, and a control unit, whereby the image is changed to the pictorial tone designated in association with identification information of the addressees.

16 Claims, 10 Drawing Sheets

ADDRESS BOOK

| ZIP CODE | ADDRESS | NAME | RELATION |
|---|---|---|---|
| 123-0001 | 1-2-3, △△-CHO, ○○-KU, TOKYO | ICHIROU AKAI | CORPORATE RELATION |
| 234-0001 | 2-3-4, △△-CHO, ○○-SHI, AKITA | JIROU AOI | PERSONAL FRIEND |
| 345-0001 | 3-4-5, △△-CHO, ○○-SHI, KAGOSHIMA | SABUROU SHIRAISHI | RELATIVE |
| 456-0001 | 4-5-6, △△-CHO, ○○-KU, OHSAKA | SHIRO KURODA | CORPORATE RELATION |
| 567-0001 | 5-6-7, △△-CHO, ○○-KU, HYOUGO | KAZUMI MOMOI | PERSONAL FRIEND |
| ........ | | | |
| ........ | | | |
| | | | |
| | | | |

FIG. 5

ADDRESS BOOK

| ZIP CODE | ADDRESS | NAME | RELATION |
|---|---|---|---|
| 123-0001 | 1-2-3, △△-CHO, OO-KU, TOKYO | ICHIROU AKAI | CORPORATE RELATION |
| 234-0001 | 2-3-4, △△-CHO, OO-SHI, AKITA | JIROU AOI | PERSONAL FRIEND |
| 345-0001 | 3-4-5, △△-CHO, OO-SHI, KAGOSHIMA | SABUROU SHIRAISHI | RELATIVE |
| 456-0001 | 4-5-6, △△-CHO, OO-KU, OHSAKA | SHIRO KURODA | CORPORATE RELATION |
| 567-0001 | 5-6-7, △△-CHO, OO-KU, HYOUGO | KAZUMI MOMOI | PERSONAL FRIEND |
| ...... | ...... | | |
| | | | |
| | | | |

FIG. 6

| CODE | TYPE OF PICTORIAL TONE | TYPE 1 | PARAMETER CONDITION |
|---|---|---|---|
| 1A | OIL PAINTING TONE | RENOIR STYLE | FILTER 1, PROCESSING CONDITION 1 |
| 1B | | UTRILLO STYLE | FILTER 2, PROCESSING CONDITION 2 |
| 1C | | GOGH STYLE | FILTER 3, PROCESSING CONDITION 3 |
| 1D | | MILLET STYLE | FILTER 4, PROCESSING CONDITION 4 |
| ... | | ... | ... |
| 2A | WATERCOLOR TONE | WARM COLOR 1 | COLOR RATIO 1, FILTER W1 |
| 2B | | WARM COLOR 2 | COLOR RATIO 2, FILTER W2 |
| 2C | | COLD COLOR 1 | COLOR RATIO 3, FILTER W3 |
| 2D | | COLD COLOR 2 | COLOR RATIO 4, FILTER W4 |
| ... | | ... | ... |
| 3A | PASTEL TONE | BRIGHT 1 | LIGHTNESS CONDITION 1, FILTER P1 |
| 3B | | BRIGHT 2 | LIGHTNESS CONDITION 1, FILTER P2 |
| 3C | | NORMAL | LIGHTNESS CONDITION 0, FILTER P3 |
| 3D | | DARK 1 | LIGHTNESS CONDITION -1, FILTER P4 |
| ... | | ... | ... |
| 4A | COLOR PENCIL DRAWING TONE | BRIGHT 1 | LIGHTNESS CONDITION 1, FILTER C1 |
| 4B | | BRIGHT 2 | LIGHTNESS CONDITION 2, FILTER C2 |
| 4C | | NORMAL | LIGHTNESS CONDITION 0, FILTER C3 |
| 4D | | DARK 1 | LIGHTNESS CONDITION -1, FILTER C4 |
| ... | | ... | ... |
| 5A | ⋮ | ... | ... |
| 5B | | ... | ... |
| 5C | | ... | ... |
| 5D | | ... | ... |
| ... | | ... | ... |
| ... | | ... | ... |

FIG. 7A

EXAMPLE OF ATTRIBUTE

| | ATTRIBUTE (RELATION) | CONDITION FOR A PICTORIAL TONE CHANGING OPERATION |
|---|---|---|
| CORPORATE RELATION | CORPORATE RELATION (ORDINARY PEOPLE) | 1A |
| | COSTUMER RELATIONSHIP | 1B |
| | SUPERIORS OF MY COMPANY | 1C |
| | COLLEAGUES, SUBORDINATES OF MY COMPANY | 3A |
| FRIENDSHIP | FRIEND (ORDINARY) | 3B |
| | FRIEND (RELATED TO THE UNIVERSITY) | 3C |
| | FRIEND (RELATED TO THE HOBBY) | 3D |
| | FRIEND (RELATED TO THE SENIOR HIGH SCHOOL) | 2A |
| RELATIVES | RELATIVE (MYSELF) | 1D |
| | RELATIVE (SPOUSE) | 2B |
| | RELATIVE 1 | 2C |
| | RELATIVE 2 | 2D |
| ⋮ | ... | ... |
| ⋮ | ... | ... |

FIG. 7B

EXAMPLE OF REGION

| REGION | CONDITION FOR A PICTORIAL TONE CHANGING OPERATION |
|---|---|
| KANTO REGION | 1A |
| TOHOKU REGION | 1B |
| HOKKAIDO | 1C |
| KYUSHU REGION | 1D |
| SHIKOKU REGION | 2A |
| ...... | |
| TOKYO METROPOLITAN AREA | 4A |
| AKITA PREFECTURE | 4B |
| KAGOSHIMA PREFECTURE | 4C |
| OSAKA PREFECTURE | 4D |
| ...... | |
| UNITED KINGDOM | 10A |
| UNITED STATES OF AMERICA | 10B |
| ASIA | 10C |
| AUSTRALIA | 10D |
| ...... | |

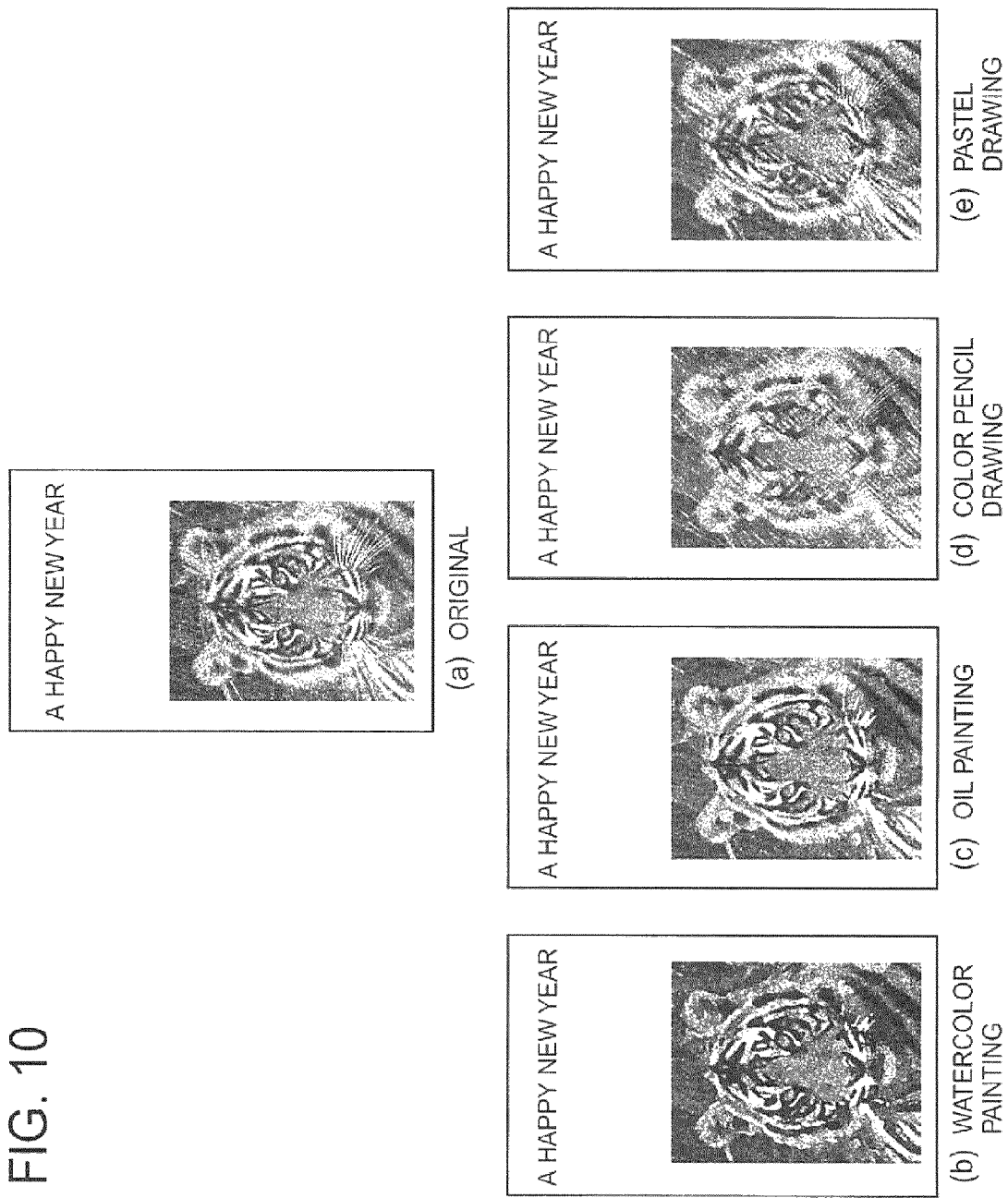

IMAGE PRINTER FOR CHANGING A TONE OF AN ORIGINAL IMAGE BASED ON ASSOCIATED IDENTIFICATION INFORMATION AND PRINTING THE IMAGE DATA HAVING THE CHANGED TONE, AND CORRESPONDING IMAGE PRINTING METHOD AND RECORDING MEDIUM

CROSS-REFERENCE TO RELATED APPLICATION

This application is based upon and claims the benefit of priority under 35 USC 119 of Japanese Patent Application No. 2011-88707 filed on Apr. 13, 2011, the entire contents of which are incorporated herein by reference.

BACKGROUND OF THE INVENTION

1. Field of the Invention

The present invention relates to an image printer having a pictorial tone changing function, an image printing method to be executed by the image printer and a recording medium in which is recorded an image printing program based on which the image printer executes the image printing method.

2. Description of the Related Art

In recent years, printers are provided which have a function to edit an image taken in from a portable storage medium such as a memory card without involving a personal computer.

With such a printer, for example, a photograph taken with a digital still camera (DSC) can easily be edited for printing directly by the printer without involving a personal computer, and therefore, the printer is now becoming a very useful tool for users who have no personal computer. Additionally, in the event that image data stored within the DSC or image data stored in an exterior recording medium is stored in the printer, the images so stored can be printed repeatedly. Thus, the printer is also useful in this respect.

In addition, Japanese Unexamined Patent Publication No. 2008-73912 (hereinafter, referred to as the "patent document") below proposes a printer which can print names and addresses of desired addressees selected from address book data obtained from an external terminal on addressing sides of sheets and images and texts on reverse or communication sides of the sheets.

In the printer described in the patent document above, however, to print image data representing the animal of the year in the twelve animal signs of the Oriental zodiac on New Year's cards, the image data on the animal of the year needs to be stored in the printer in advance. In addition, in order to change image data representing the animal of the year depending on addressees, several types of image data need to be stored in the printer in advance, leading to a situation in which the image data to be stored in the printer exceeds the capacity of a built-in memory.

BRIEF SUMMARY OF THE INVENTION

The invention has been made in view of the problem inherent in the related art, and an object of the invention is to provide an image printer having a pictorial tone changing function which can mitigate the load of a built-in memory by making predetermined changes in pictorial tone in association with identification information such as names and addresses of addressees, an image printing method to be executed by the image printer, and a recording medium in which is recorded an image printing program based on which the image printer executes the image printing method.

According to an aspect of the invention, there is provided an image printer comprising:

an original image storage unit which stores data of an original image;

an address book storage unit which stores addressees data including names and addresses of addressees;

an attribute setting unit which sets a pictorial tone changing attribute for each of the addressees data which changes the data of the original image to a designated tone;

an addressees data selection unit which selects one addressee data to be printed from the addressees data;

a pictorial tone changing unit which changes the data of the original image to image data having the designated tone based on the pictorial tone changing attribute set for the addressee data by the attribute setting unit;

a printing unit which executes a printing operation of printing the addressee data and the image data having the designated pictorial tone; and a control unit, in response to an addressee printing instruction to print the selected addressee data, (a) which makes the printing unit execute a printing operation of printing the addressee data on first area of printing media, and (b) which makes the printing unit execute a printing operation of printing the changed image data having the designated pictorial tone on second area of the printing media.

In addition, according another aspect of the invention, there is provided an image printing method to be executed by the image printer, comprising the steps of:

storing data of an original image in an original image storage unit;

storing addressees data including names and addresses of addressees in an address book storage unit;

setting a pictorial tone changing attribute for each of the addressees data which changes the data of the original image to a designated tone;

selecting one addressee data to be printed from the addressees data;

changing the data of the original image to image data having the designated tone based on the pictorial tone changing attribute set for the addressee data by the attribute setting unit;

executing a printing operation of printing the addressee data and the image data having the designated pictorial tone; and in response to an addressee printing instruction to print the selected addressees data, (a) executing a printing operation of printing the addressee data on first area of printing media, and, (b) executing a printing operation of printing the changed image data having the designated pictorial tone on second area of the printing media.

Further, according to a further aspect of the invention, there is provided a non-transitory computer-readable recording medium with an executable image printing program stored thereon, wherein the image printing program instructs a computer of the image printer to perform the following steps:

storing data of an original image in an original image storage unit;

storing addressees data including names and addresses of addressees in an address book storage unit;

setting a pictorial tone changing attribute for each of the addressees data which changes the data of the original image to a designated tone;

selecting one addressee data to be printed from the addressees data;

changing the data of the original image to image data having the designated tone based on the pictorial tone changing attribute set for the addressee data by the attribute setting unit;

executing a printing operation of printing the addressee data and the image data having the designated pictorial tone; and in response to an addressee printing instruction to print the selected addressees data, (a) executing a printing operation of printing the addressee data on first area of printing media, and (b) executing a printing operation of printing the changed image data having the designated pictorial tone on second area of the printing media.

According to the invention, there can be provided the image printer which can print images of different styles while mitigating the load of the built-in memory by making the predetermined changes in pictorial tone to the image in association with the identification information such as the names and addresses of the addressees, the image printing method to be executed by the image printer, and the recording medium in which is recorded the image printing program which makes the image printer execute the image printing method.

BRIEF DESCRIPTION OF THE DRAWINGS

FIG. 5 is an explanatory diagram showing the configuration of data on addressees in an address book according to the embodiment of the invention.

FIG. 6 is an explanatory diagram showing types of pictorial tone changing attributes of the image printer according to the embodiment of the invention.

FIGS. 7(a) and (b) shows explanatory diagrams of type codes of pictorial tone changing attributes which are set by relation with addressees and region where addressees reside in the address book according to the embodiment of the invention.

FIG. 10 shows examples of cards which are printed by the image printer according to the embodiment of the invention while making changes in pictorial tone.

DETAILED DESCRIPTION OF THE PREFERRED EMBODIMENT

Figure 1:
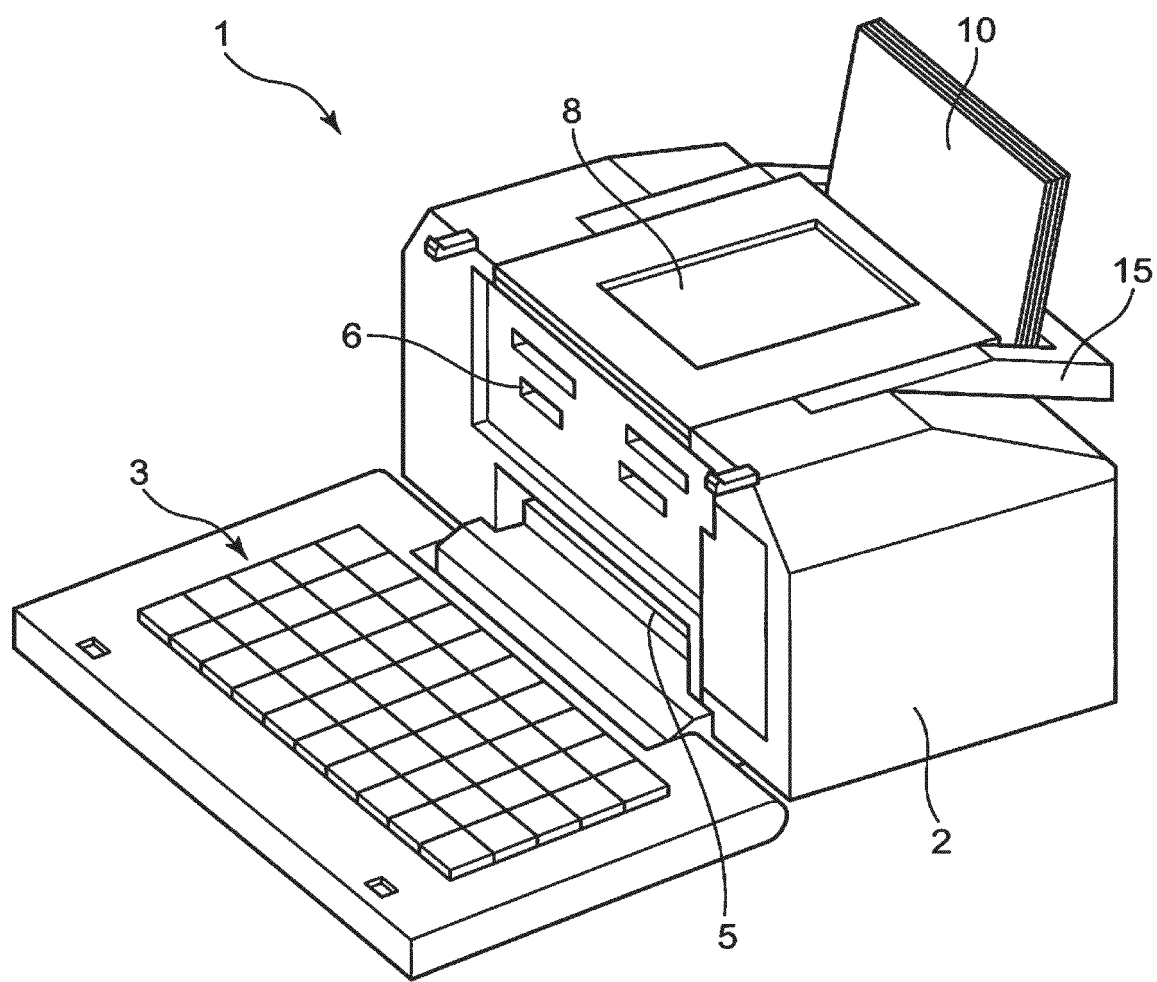
FIG. 1 is a perspective view of an image printer according to an embodiment of the invention.
Figure 2:
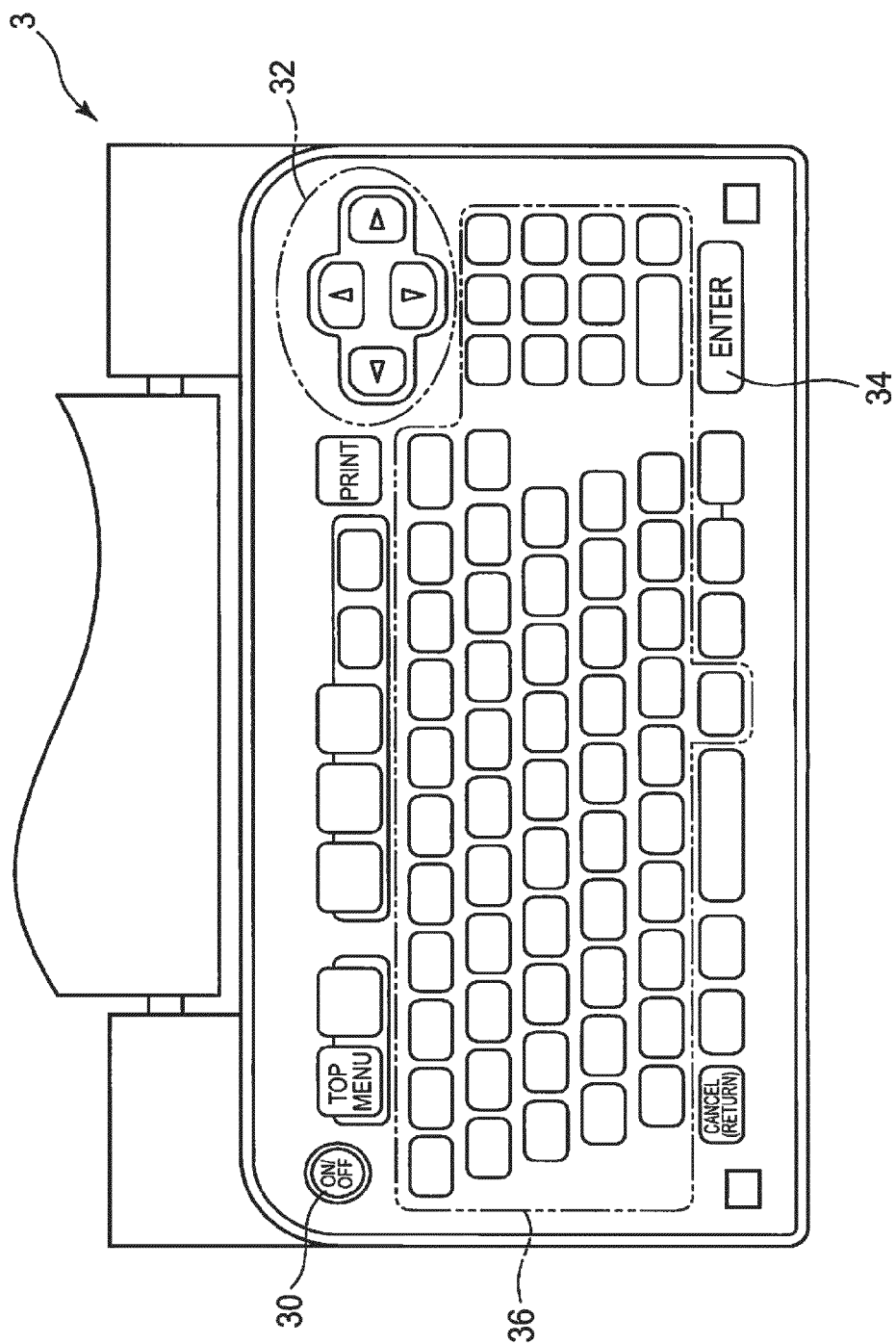
FIG. 2 is an explanatory diagram showing a keyboard of the image printer according to the embodiment of the invention.
Figure 3:
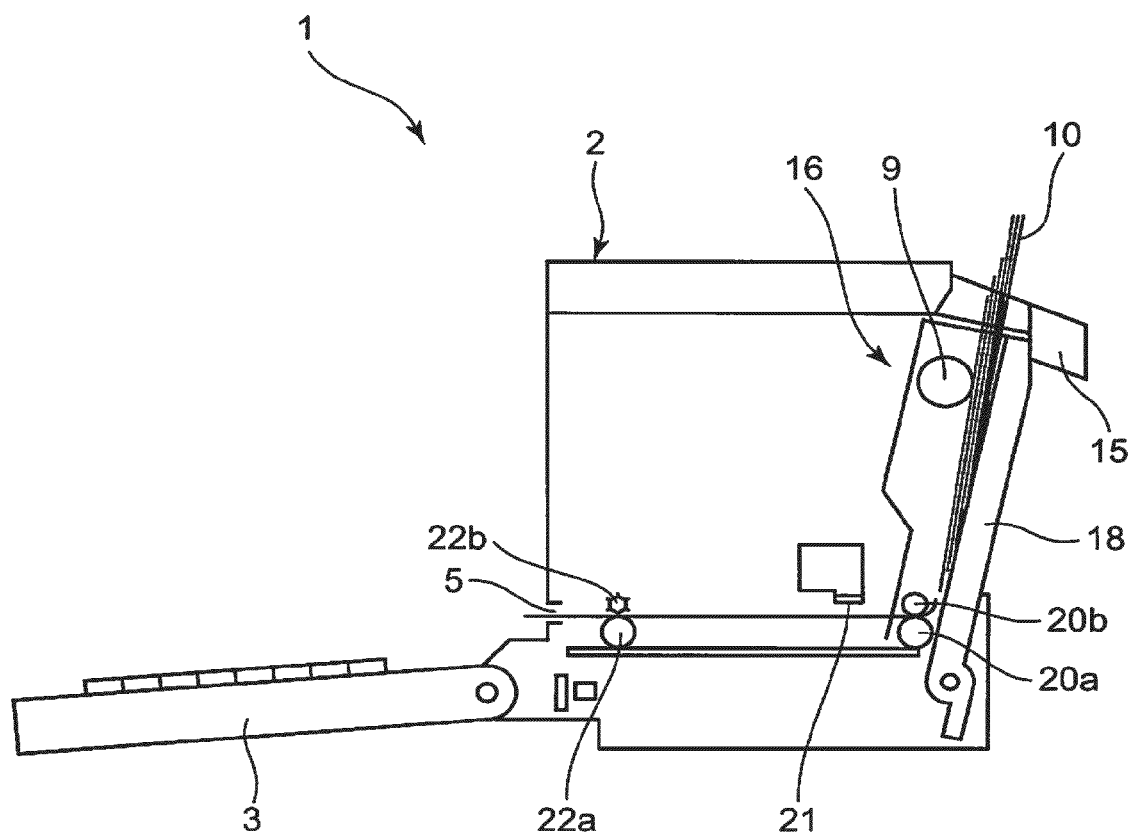
FIG. 3 is an exemplary sectional view of the image printer of the embodiment of the invention.

Hereinafter, an embodiment of the invention will be described by reference to the drawings. The invention relates to an image printer 1 which can print prepared texts as well as names and addresses of addressees by use of data on addressees. FIG. 1 is a perspective view showing an external appearance of the image printer 1, FIG. 2 is an explanatory diagram showing a keyboard 3 of the image printer 1, and FIG. 3 is an exemplary side sectional view of the image printer 1. In FIG. 3, hatching is not given for the sake of easy understanding of what is shown in the diagram.

The image printer 1 is an apparatus for printing information on relatively small printing sheets 10 such as post cards (100×148 mm), L-size sheets (89×127 mm) and 2 L-size sheets (178×127 mm). The image printer 1 has various functions including a pictorial tone changing function to change a photographic image taken by a digital camera or a scanned image to an image having a pictorial tone, a function to prepare an address book, a function to automatically write an address to post cards directly from the address book, a function to capture a photographic image and print it as a photograph, a function to edit texts and a function to combine the captured image and the edited text and print them on post cards.

When set to a post card printing mode by the pictorial tone changing function, the image printer 1 of the invention changes an original image designated to images having predetermined pictorial tones which are set individually to names and addresses of addressees which are printed on one or front sides of post cards and then prints the images having predetermined pictorial tones on the other or reverse sides of the post cards in association with the names and addresses of the addressees.

As shown in FIG. 1, this image printer 1 includes a box-shaped casing 2, and a keyboard 3 as an input unit is disposed in front of the casing 2. This keyboard 3 is installed rotatably near a front lower end of the casing 2. When in use, the keyboard 3 is unfolded flat to expand to the front of the casing 2 as shown in FIG. 1, while when not in use, the keyboard 3 is folded up to face a front side of the casing 2 for stowage.

As shown in FIG. 2, disposed on the keyboard 3 are a power on/off switch key 30 used to switch on and off a power supply, cursor keys 32 used to select items and change settings of the items selected, an enter key 34 used to determine on selections and changes made to progress the operation, a top menu key used to cause a top menu screen to be displayed on a display unit 8, a print key used to instruct an execution of printing, and character and numeral keys 36 used to input characters and numbers. Each key functions as an input device to transmit a predetermined operation signal based on an input operation performed by the user to the control unit 41 as described hereinafter.

A sheet discharge port 5 and a storage medium insertion port 6 are formed in a front side of the casing 2 as shown in FIG. 1. Printing sheets 10 such as post cards or photographic papers on which printing is completed are discharged from the sheet discharge port 5, and a portable storage medium such as a memory card can be inserted into the storage medium insertion port 6. By inserting a detachable portable storage medium such as a memory card into the storage medium insertion port 6, image data of photographs taken by a digital camera, edited data such as texts which are edited on a personal computer and addressee data of an address book which includes names and addresses of a plurality of addressees can be taken into the image printer 1, and on the contrary, data which are edited on the image printer 1 can be preserved in the memory card inserted.

The liquid crystal display unit 8 is disposed on an upper side of the casing 2 as a display, and this display unit 8 can be turned in the direction of the front side of the casing 2. Various types of data required on the image printer 1 is displayed on the display unit 8, and the various types of data include input details which are displayed on a screen in association with input signals from the keyboard 3, a menu screen required for various types of settings, and photographic images captured from the digital camera for display thereon. This display unit 8 may be configured as a touch screen from time to time. By configuring the display unit 8 as the touch screen, a simple input operation can be performed on the display unit 8 without using the keyboard 3.

Further, a handle 15 is mounted on an upper portion of the casing 2 so as to rotate from the rear of the casing 2 to a position lying above the casing 2. This handle 15 has a substantially U-shape and is grabbed by the user for him or her to carry the image printer 1.

As shown in FIG. 3, the casing 2 has a space portion 16 which is opened to a back side thereof, and a sheet feeding tray 18 is disposed so as to close the opening in the space portion 16. The sheet feeding tray 18 is pivotally mounted at the rear of the casing 2 in a position lying near a lower end thereof. The sheet feeding tray 18 can be rotated so that an upper end thereof moves in a front-to-rear direction and accommodate a plurality of printing sheets 10 in a pile.

A pick-up roller 19 is disposed in an upper position inside the sheet feeding tray 18, and printing sheets 10 accommodated in the sheet feeding tray 18 are fed downwards sheet by sheet by the pick-up roller 19. Delivery rollers 20*a*, 20*b* are disposed near a lower end of the sheet feeding tray 18 for delivering the printing sheet 10 fed downwards by the pick-up roller 19 in the direction of the sheet discharge port 5 of the casing 2. Further, a printing head 21, which is a printing mechanism, is disposed in an interior of the casing 2 in a position lying in front of and near the delivery rollers 20*a*, 20*b*. Additionally, discharge rollers 22*a*, 22*b* are disposed in the interior of the casing 2 in a position lying to the front of the printing head 21 for discharging the printing sheet 10 on which printing is completed from the sheet discharge port 5. The delivery roller 20*a* and the discharge roller 22*a* are controlled to rotate by stepping motors, not shown, so as to deliver a printing sheet 10 at a predetermined speed. The pick-up roller 19, the delivery rollers 20*a*, 20*b*, and the discharge rollers 22*a*, 22*b* function as a delivery mechanism of the image printer 1.

The printing head 21, which is the printing mechanism, is an inkjet type printing head 21 which has nozzles which jet individually inks of yellow (Y), magenta (M) and cyan (C) colors. The printing head 21 executes printing by jetting the inks of the respective colors to a printing sheet 10. Although the printing head 21 is described as being the inkjet type printing head 21, the invention is not limited to the inkjet type printing head.

Then, the printing sheets 10 accommodated in the sheet feeding tray 18 are sequentially fed downwards by the pick-up roller 19, starting from a printing sheet 10 positioned on a top or front of the pile. Then, the printing sheet 10 is fed out below the printing head 21 while the printing sheet 10 being held between the delivery rollers 20*a*, 20*b*. When printing thereon is completed, the printing sheet 10 is fed forwards to be inserted between the discharge rollers 22*a*, 22*b* so as to be discharged to the outside of the image printer 1 from the sheet discharge port 5.

Figure 4:
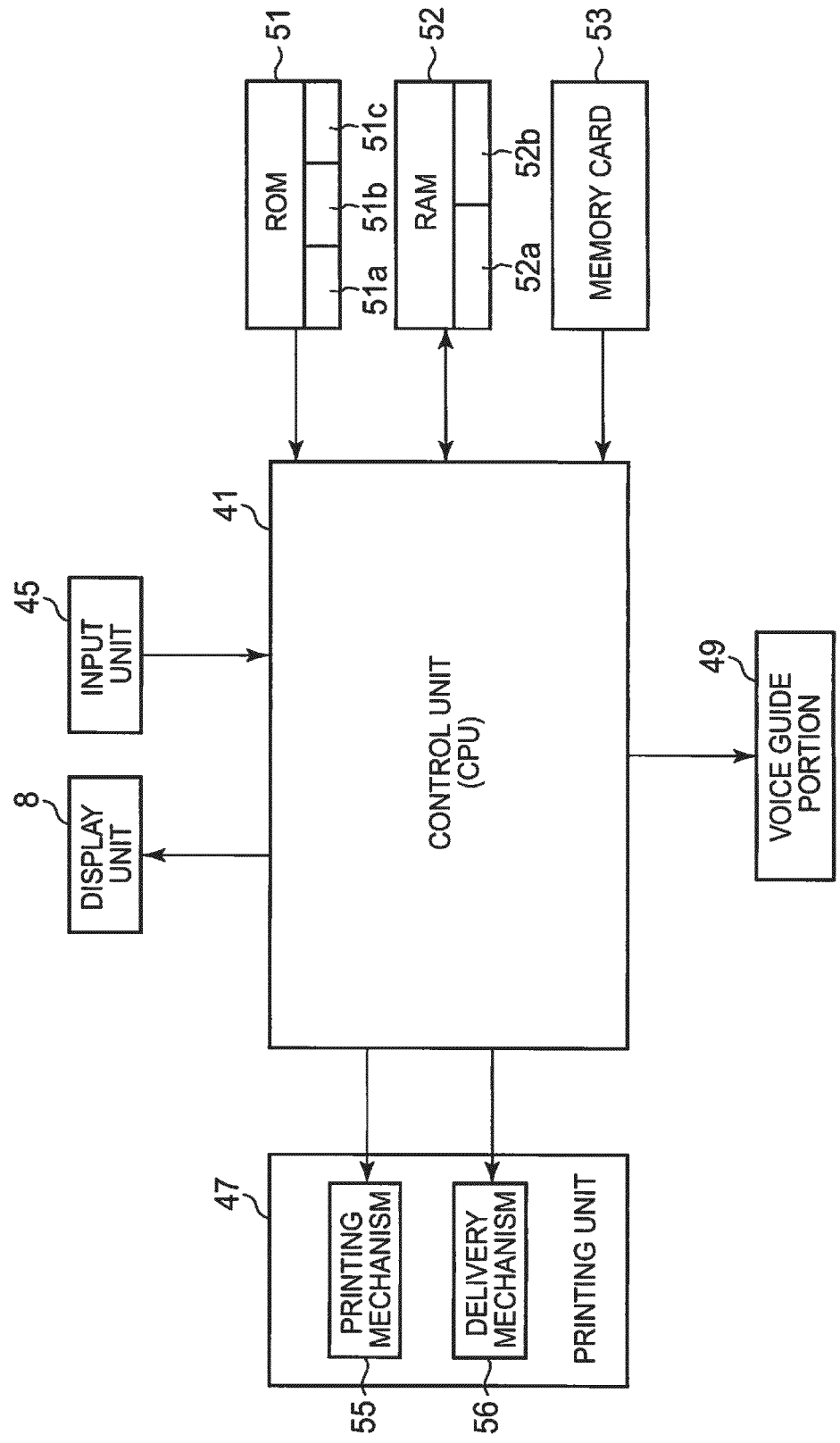
FIG. 4 is a functional block diagram of the image printer according to the embodiment of the invention.

Next, a control circuit of the image printer 1 of the embodiment will be described. FIG. 4 is a functional block diagram of the image printer 1. As shown in FIG. 4, the image printer 1 includes a control unit 41 which governs the whole of the system, a storage unit made up of a ROM 51, a RAM 52 and a memory card 53, a display unit 8, an input unit 45, a printing unit 47 and a voice guide unit 49 such as a speaker.

The input unit 45 is the keyboard 3 which is used by the user when he or she inputs information and hence includes the power on/off switch key 30, the cursor keys 32, the enter key 34 and the print key and the like. The display unit 8 is the aforesaid liquid crystal display panel which displays thereon various operation screens. The display unit 8 is controlled by the control unit 41 which receives a predetermined operation signal to display a predetermined operation screen in a plurality of operation screens. The input unit 45 includes a touch screen when the touch screen is provided on a surface of the display unit 8.

The control unit 41 is a CPU (a central processor unit) and activates a system program stored in advance in the ROM 51, or a control program stored in the memory card 53 in response to a key operation signal from the input unit 45 or automatically so as to control operations of respective circuit portions by use of the RAM 52 as a work memory 52*b*.

Stored in the ROM 51 are fonts used in editing texts and printing type faces, information on standards of printing papers to be edited, and control programs used when the control unit 41 controls the various constituent units.

The RAM 52 is the work memory 52*b* which stores information used in editing a text such as characters inputted at the input unit 45, display data which is displayed on the display unit 8, variables and registers which are used in arithmetic operation, and image information during image processing. Additionally, the memory card 53 stores data of a photographic image taken by the digital camera or a scanned image.

Data of an original image such as the photographic image taken by the digital camera or the scanned image which is stored in the memory card 53 can be copied therefrom via the control unit 41 for storage in an original image storage device 51*b* of the erasable ROM 51 which is made up of a flash memory and the like.

The printing unit 47 is made up of a printing mechanism 55 and a delivery mechanism 56. The printing mechanism 55 is made up of the printing head 21 described above and executes printing on a printing sheet 10.

The delivery mechanism 56 is made up of the stepping motors which rotate the pick-up roller 19, the delivery rollers 20*a*, 20*b* and the discharge rollers 22*a*, 22*b* and delivers a printing sheet 10.

The voice guide unit 49 outputs an audio or voice message such as an error sound or audio guidance for operations.

An image printing program 51*c* which is stored in the ROM 51 of the invention makes the control unit 41 execute an image printing method of the image printer 1 which has a pictorial tone printing function for changing data of the selected original image to image data having a pictorial tone and then for executing printing on a printing sheet 10 which is a printing medium based on the image data so changed.

Specifically, the image printing program 51*c* makes the control unit 41 function as an original image selection unit which executes an original image selecting operation of selecting an original image to be printed. Additionally, the image printing program 51*c* makes the control unit 41 function as an attribute setting unit which executes an attribute setting operation of setting any of a plurality types of pictorial tone changing attributes which are prepared in advance for changing the data of the original image to image data having a predetermined pictorial tone for each addressee in an address book.

Further, the image printing program 51*c* makes the control unit 41 function as an address book selection unit which executes an address book selecting operation of selecting addressee data to be printed. Additionally, the image printing program 51 makes the control unit 41 function as a pictorial tone changing unit which executes a pictorial tone changing operation of changing the data of the original image selected to image data having a pictorial tone designated based on the pictorial tone changing attribute set.

The image printing program 51*c* makes the control unit 41 control the printing unit 47 to execute a printing operation of printing names and addresses of addressees in the address book and image data having predetermined pictorial tones.

Further, the image printing program 51*c* makes the control unit 41 control the printing unit 47 to execute, as a printing operation responding to a printing instruction to print a name and address of an addressee selected from the address book, a printing operation of printing the name and address of the addressee selected on one or a front side of a post card, makes the control unit 41 to execute, as a pictorial tone changing operation, a pictorial tone changing operation of changing the data of the original image to the image data having the predetermined pictorial tone based on the pictorial tone changing attribute which is set to the addressee in the address book, and makes the control unit 41 control the printing unit 47 to print the image data having the predetermined pictorial tone so changed on the other or reverse side of the post card.

In addition, when a plurality of post cards are printed, a continuous printing attribute storage device 52*a* of the RAM 52 of the invention stores individually the pictorial tone changing attributes set to the respective addressees in the address book in the order of printing.

An address book storage device 51*a* of the ROM 51 of the invention is an address book memory which can store, for example, several hundreds of pieces of addressee data such as zip codes, addresses, names, relations (personal relations with the user) as shown in FIG. 5. When the user operates to set the image printer 1 to an editing mode, the address book memory stored in the address book storage device 51*a* is deployed on the RAM 52 and when the user conducts editions such as addition, corrections or reference and then registers them, the address book memory so edited is stored in the address book storage device 51*a* again.

In addition, the addressee data which are stored in the address book storage device 51*a* include the data of address, name and personal relations including friendship and data of pictorial tone changing attributes for changing the data of the original image to image data having pictorial tones are associated with the addressee data including address, name, the personal relations and the like and as a result of that, the data of pictorial tone changing attributes are made to be set depending upon the addressee data.

In addition, the pictorial tone changing attributes include, as shown in FIG. 6, an oil painting tone, a watercolor tone, a pastel painting tone, and a color pencil drawing tone as types of pictorial tones.

In this invention, different types of images can be generated by use of the pictorial tone changing function to change the data of the original image to the oil painting tone, the watercolor tone, the pastel tone and the color pencil drawing tone depending upon the addressees. Therefore, as few pieces of original image data as possible may only have to be stored in the ROM 51, and therefore, the load or capacity of the memory can be mitigated.

Additionally, the pictorial tone changing attributes include types which are formed by subdividing the types of pictorial tones described above. For example, the oil painting tone includes, as shown in FIG. 6, Renoir style, Utrillo style, Gogh style, and Millet style.

Pictorial tone images in the pictorial tone changing attributes are images which are made to look like those painted or drawn by brushes or pencils by applying predetermined image processing to the original image. Then, image processing parameter conditions include, for example, filters, processing conditions, color ratios and lightness conditions. Here, the description of a relation between set values for filters and processing conditions and processing methods will be omitted, and only the characteristics of pictorial tone changing will be described.

By setting these parameter conditions, a clear image can be obtained, for example, by intensifying a change in density value of the image. Alternatively, an image that can easily be seen can be obtained by removing random noise on the image so as to suppress a minute change in density value of each pixel.

The Renoir style in the oil painting tone is referred to, for example, as 1A as a type code, and to produce a moderately sweet and bright picture as characteristics of pictorial tone changing, for example, filter 1 and processing condition 1 are set as parameter conditions.

The Utrillo style in the oil painting tone is referred to, for example, as 1B as a type code, and to produce a picture which is painted using paints of translucent colors such as brown, green and red which is characteristic of a geometric composition as characteristics of pictorial tone changing, for example, filter 2 and processing condition 2 are set as parameter conditions.

The Gogh style in the oil painting tone is referred to, for example, as 1C as a type code, and to produce a picture which is painted in clear colors and with strong brushstrokes as characteristics of pictorial tone changing, for example, filter 3 and processing condition 3 are set as parameter conditions.

The Millet style in the oil painting tone is referred to, for example, as 1D as a type code, and to produce a slightly lonesome picture which is impressive of dark colors as characteristics of pictorial tone changing, for example, filter 4 and processing condition 4 are set as parameter conditions.

Additionally, as with the oil painting tone, in the other types of pictorial tones such as the watercolor tone, the pastel painting tone and the color pencil drawing tone, the characteristics of pictorial tone changing are subdivided into types and parameter conditions which are set as shown in FIG. 6. In the case of the watercolor tone, type codes are set as 2A, 2B, 2C and 2D, for example. In the case of the pastel painting tone, type codes are set as 3A, 3B, 3C and 3D, for example. In the case of the color pencil drawing tone, type codes are set as 4A, 4B, 4C and 4D, for example.

The type codes (1A, 2A, 3A, 4A and the like) which constitute the pictorial tone changing attributes as has been described above are set or assigned to individual addressees in the address book by the user so as to change the data of the original image to image data having the pictorial tones so assigned. The user is allowed to set the pictorial tone changing attributes in the way described above using the address book editing function of the image printer 1 via the control unit 41 which functions as the attribute setting unit.

The invention is not limited to the case where the type codes representing the pictorial tone changing attributes which are stored in the addressee data of the address book which is stored, in turn, in the address book storage device 51*a* are set by the user in association with individual addressees in the address book. For example, as shown in FIG. 7(*a*), functioning as the attribute setting unit, the control unit 41 may automatically set the type codes which represent the pictorial tone changing attributes in association with each of relations of the user with personal friends, colleagues in the company to which the user belongs and relatives as conditions for an automatic pictorial tone changing operation by use of information on relations (attribute) in the address book.

Additionally, the invention is not limited to the case where the type codes representing the pictorial tone changing attributes which are stored in the addressee data of the address book which is stored, in turn, in the address book storage device 51*a* are set by the user in association with individual addressees in the address book. For example, as shown in FIG. 7(*b*), functioning as the attribute setting unit, the control unit 41 may automatically set the type codes which represent the pictorial tone changing attributes in association with regions where the addressees reside as conditions for an automatic pictorial tone changing operation by use of information on regions described in the address book.

Additionally, as has been described before, the continuous printing attribute storage device 52*a* of the RAM 52 stores the type codes which represent the pictorial tone changing attributes corresponding to the pictorial tone images based on the addressee data of the address book in the order of printing pieces of addressee data in the address book when the pieces of addressee data are printed on the one or front sides of the printing media.

As a result of the continuous printing attribute storage device 52*a* being provided in the RAM 52, having executed a continuous printing operation of printing continuously names and addresses of different addressees on one or front sides of a plurality of post cards which are printing sheets 10, the control unit 41 causes the post cards on the front sides of which the names and addresses of the addressees have been printed and which are now discharged from the sheet discharge port 5 to be reset in the sheet feeding tray 18 for start of printing on back sides thereof. Then, since the pictorial tone changing attributes associated with the pictorial tone images are stored in the continuous printing attribute storage device 52*a* based on the addressee data of the address book in the order of printing the pieces of addressee data in the address book according to which the names and addresses of the addressees have been printed on the front sides of the post cards, the control unit 41 reads in the pictorial tone changing attributes based on the addressee data of the address book in the order of printing for execution of the predetermined pictorial tone changes to the original image and then makes the printing unit 47 to execute the printing on the back side of the post cards.

Figure 8:
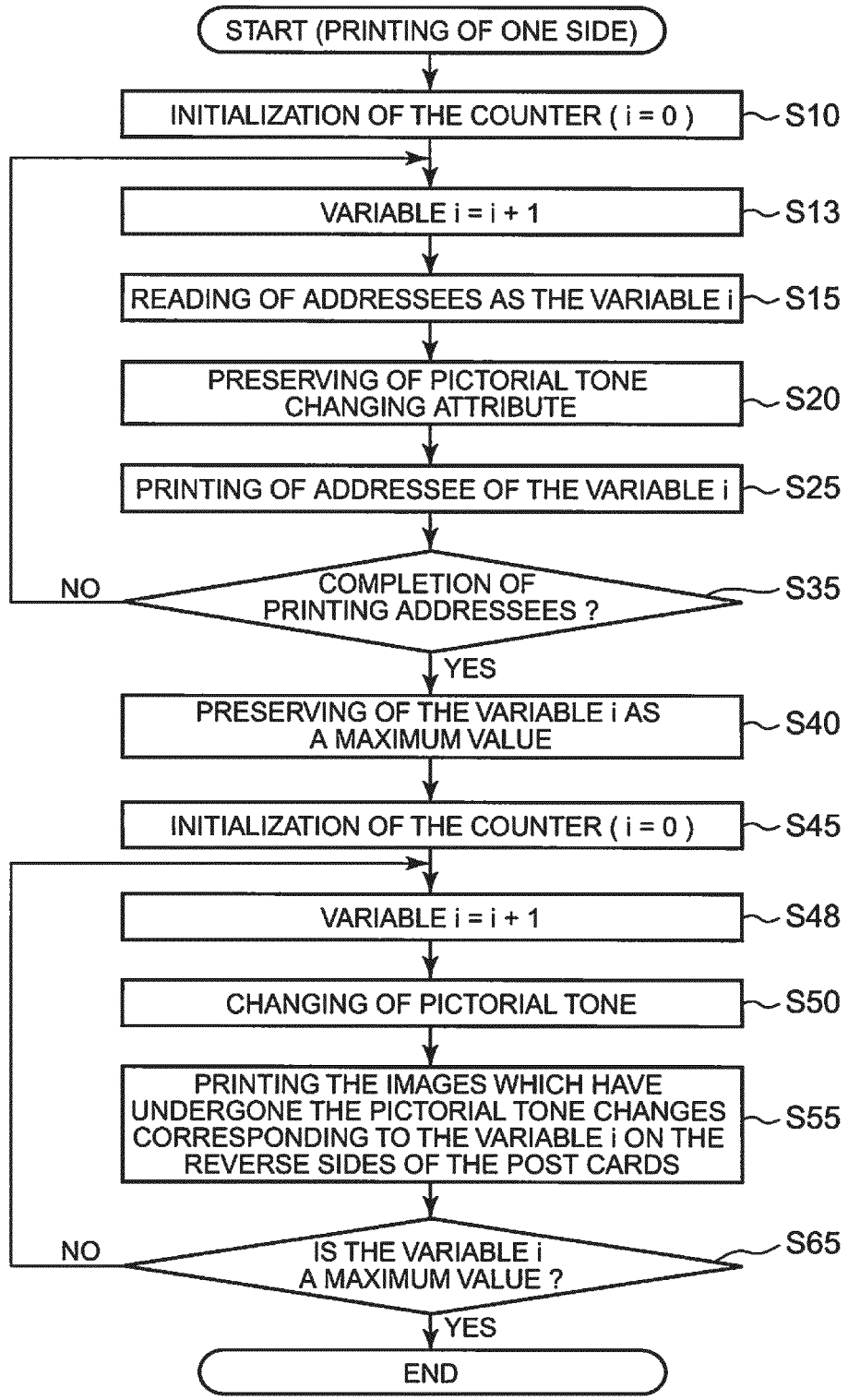
FIG. 8 is a flowchart showing the flow of a printing operation which is executed by the image printer according to the embodiment of the invention while making changes in pictorial tone in association with addressees.

Next, a flow of changing the pictorial tone of the original image in association with addressees will be described in detail by use of a flowchart. FIG. 8 shows a flowchart showing the flow of a printing operation performed when printing names and addresses of addressees are printed on a plurality of post cards by the image printer 1, in which the names and addresses of the addressees are printed first on front sides of the post cards, and thereafter, the post cards on which the names and addresses of the addressees have been printed and which have been discharged from the image printer 1 are then reset in the sheet feeding tray 18 so that the images having the different pictorial tones, which resulted from the pictorial tone changes made to the original image, are printed on reverse sides of the post cards.

Firstly, the user sets the image printer 1 to the post cards continuous printing mode which utilizes the pictorial tone changing function. Then, the user selects addressees from the address book stored in the address book storage device 51*a* and reads out from the original image storage device 51*b* an original image or selects from images stored in the memory cards 53 an image whose pictorial tone is to be changed as required for printing on reverse sides of post cards. Then, when the user starts printing, the control unit 41 executes an initializing operation (step S10) of initializing a variable i which is a counter value used in counting the number of post cards that have undergone printing so that the pictorial tone changing attributes associated with the pictorial tone images are stored in the continuous printing attribute storage device 52*a* in the order of printing the names and addresses of the addressees selected on front sides of the post cards.

Next, the control unit 41 executes an adding operation (step S13) of adding (+1) to the variable i. Following this, the control unit 41 executes an addressees reading operation (step S15) of reading the data of the addressees selected from the addressee data in the address book which is stored in the address book storage device 51*a* as the variable i.

The control unit 41 executes a continuous printing attribute storing step (step S20) of preserving the type codes which are stored as the pictorial tone changing attributes associated with the addressees read as the variable i in the continuous printing attributes storage device 52*a*.

Next, the control unit 41 executes a printing operation (step S25) of printing the names and addresses of the addressees read on the front sides of the post cards.

Then, the control unit 41 executes a front side printing ending determination (step S35) of determining whether or not the user selects further addressees for continuation of printing. When the user selects a "continue addressee printing" for continuation of printing of addressees, the flow returns to step S13. On the contrary, when the user selects an "end addressee printing" for ending the printing of the addressees without continuing the printing of further addresses, the flow proceeds to step S40.

When the printing of the addressees is completed, the control unit 41 executes an addressee number preserving operation (step S40) of preserving the count value (the number of post cards that have undergone printing) of the variable i in the work memory 52 as a maximum value imax.

When executing a printing operation of printing the predetermined pictorial tone images on the reverse sides of the post cards, the control unit 41 executes a counter clearing operation (step S45) of initializing the variable i which is the counter value of the RAM 52. Additionally, the control unit 41 causes the display unit 8 to display thereon a message reading, "Reset the complete pile of post cards which have undergone printing and which have been discharged from the sheet discharge port 5 in the sheet feeding tray 18 as it is with a predetermined side oriented upwards."

Next, the control unit 41 executes an adding operation (step S48) of adding (+1) to the variable i. Then, the control unit 41 executes a pictorial tone changing operation (step S50) of reading the type code of the variable i which is preserved in the continuous printing attribute storage device 52*a* so as to change the pictorial tone of the original image accordingly.

Then, the control unit 41 executes a printing operation (step S55) of printing the data of the images which have undergone the pictorial tone changes on the reverse sides of the post cards.

Then, the control unit 41 executes a printing completion determination (step S65) of determining whether or not the variable i has reached the maximum value imax. If the variable i is determined as not having reached the maximum value imax, the control unit 41 determines that the names and addresses of the addressees selected have been printed on the front sides of all the post cards, but there are left some post cards on the reverse sides of which the required pictorial tone images have not yet been printed, returning to step S48.

On the contrary, if the variable i is determined as having reached the maximum value imax, the control unit 41 determines that all the printing operations required have been completed, ending the operations.

Namely, according to the image printer 1, since the original image can be changed to the predetermined pictorial tone images in association with the individual addressees selected for printing on the reverse sides of the post cards, the image printer 1 may only have to preserve only the original image therein. Thus, with the image printer 1, the pictorial tone images which differ in tone or style in association with the individual addressees selected can be printed while mitigating the load of the built-in memory, when an image associated with the animal of the year is printed on reverse sides of New Year's cards, for example.

In the invention, for example, when having a two-sided printing or backing up function which utilizes an automatic sheet feeding function, the image printer 1 may adopt a configuration in which in starting printing on reverse sides of printing sheets 10 such as New Year's cards after names and addresses of addressees selected have already been printed on front sides thereof, the image printer 1 executes the pictorial tone change of an original image selected based on the pictorial tone changing attributes which are associated with the pictorial tone images possessed by the addressee data of the address book which shows the names and addresses of the addressees selected which have already been printed on the front sides and then executes printing on the reverse sides.

Figure 9:
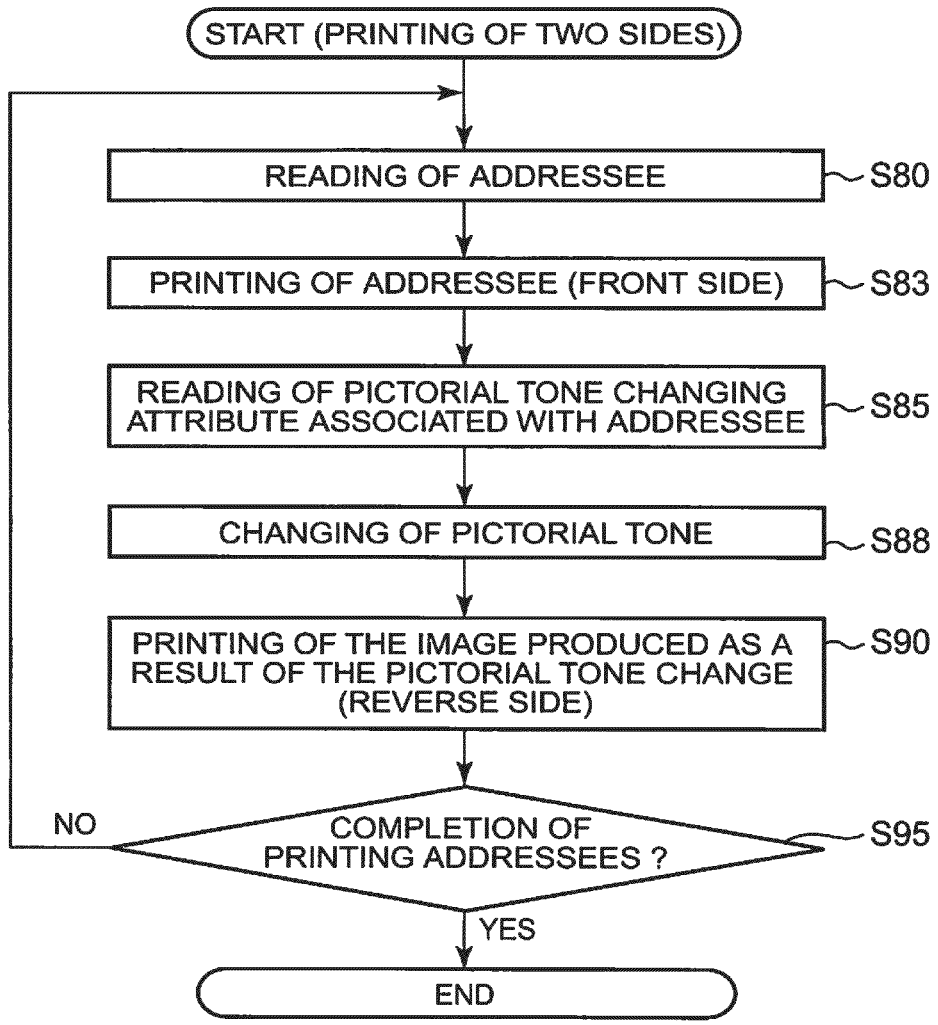
FIG. 9 is a flowchart showing the flow of a printing operation which is executed by the image printer according to the embodiment of the invention while making changes in pictorial tone in association with addressees.

Next, the flow of a printing operation of printing names and addresses of addressees selected on front sides and printing pictorial tone images associated with the addressees on reverse sides of post cards will be described in detail by reference to a flowchart shown in FIG. 9. The printing operation is carried out through manual sheet feeding in which the post cards are printed sheet by sheet or automatic sheet feeding in which the image printer 1 has the two-sided printing or backing up function which utilizes the automatic sheet feeding function in which post cards are subjected to two-sided printing sheet by sheet. In the latter case, the image printer 1 prints a name and address of an addressee selected on a front side of a post card and changes the pictorial tone of the original image selected to the pictorial tone image associated with the addressee for printing it on a reverse side of the post card.

Firstly, the user sets the image printer 1 to a post card two-sided printing mode which utilizes the pictorial tone changing function. The user selects an addressee from the address book memory which is stored in the address book storage device 51a and selects further from the original image storage device 51b an original image or from images stored in the memory card 53 an image which is to be subjected to pictorial tone change associated with the addressee selected for printing on a reverse side of a post card. Then, when starting printing, the control unit 41 executes an addressee reading operation (step S80) of reading data of the addressee selected from the address book memory which is stored in the address book storage device 51a for printing it on a front side of the post card.

Next, the control unit 41 controls the printing unit 47 to execute a printing operation (step S83) of printing a name and address of the addressee read on the front side of the post card.

When completing the printing operation of printing the name and address of the addressee selected on the front side of the post cards, the control unit 41 causes the printed post card to be inserted into the sheet feeding tray 18 through manual feeding with the orientation thereof changed. Alternatively, the control unit 41 controls the printing unit 47 to deliver the post card which has been printed on the front side thereof in a sheet feeding direction for printing on a reverse side thereof using the automatic sheet feeding function.

Then, the control unit 41 executes an attribute setting operation (step S85) of reading the type code which is the pictorial tone changing attribute associated with the addressee from the address book data stored in the address book storage device 51a.

Next, the control unit 41 executes a pictorial tone changing operation (step S88) of changing the pictorial tone of the original image based on the type code so read.

Then, the control unit 41 controls the printing unit 47 to execute a printing operation (step S90) of printing the data of the image produced as a result of the pictorial tone change on the reverse side of the post card.

When completing the printing operation (step S90), the control unit 41 executes an ending determination (step S95) of determining whether or not the addressee printing is ended whereupon the display unit 8 is caused to display thereon a message, reading "Should the post card two-sided printing mode using the pictorial tone changing function be continued?"

When the user operates to end the printing, the printing operation is ended. On the contrary, when the user operates to set another addressee and original image, the flow returns to the address reading operation (step S80) to read an addressee to be printed on the next post card.

In this way, the name and address of the addressee and the pictorial tone image associated therewith can be printed on both the sides of the post card sheet by sheet through manual sheet feeding. Alternatively, in the case of the image printer 1 having the two-sided printing or backing up function, the user does not have to reset the post card which has been printed on the front side in the sheet feeding tray. Moreover, the predetermined pictorial tone change is carried out for each addressee selected for printing on the reverse side of the post card. Thus, the image printer 1 may only have to preserve only the original image in the memory provided therein. Therefore, with the image printer 1, images having various pictorial tones associated with addressees selected can be printed, for example, when an image associated with the animal of the year is printed on reverse sides of New Year's cards, while mitigating the load of the built-in memory.

In addition, with the image printer 1, images like those shown in FIG. 10 as examples can be printed on reverse sides of New Year's cards. For example, by use of the pictorial tone changing function, an original image of tiger shown in FIG. 10(a) can be modified to a watercolor tone shown in FIG. 10(b), an oil painting tone shown in FIG. 10(c), a color pencil drawing tone shown in FIG. 10(d) and a pastel painting tone shown in FIG. 10(e) so that various types of New Year's cards can be produced in association with individual addressees.

According to the invention, the image printer 1 may only have to preserve only an original image in the memory provided therein when an image of the animal of the year for New Year's cards, an image of picturesque scenery for Christmas cards or an image used on post cards notifying change of address is changed in pictorial tone in association with addressees for printing on those cards, thereby making it possible to mitigate the load of the built-in memory.

Thus, according to the embodiment of the invention, there can be provided the image printer 1 which can mitigate the load of the built-in memory by changing the pictorial tone of the original image in association with identification information such as addressees using the pictorial tone changing function provided therein, the image printing method executed by the image printer 1, and the recording medium in which the image printing program is recorded based on which the image printer 1 executes the image printing method.

Additionally, according to the embodiment of the invention, the pictorial tone changing attributes include the oil painting tone, the watercolor tone, the pastel painting tone and the color pencil drawing tone, whereby the original image can be set to a pictorial tone of warm colors or a pictorial tone of cold colors in association with characters and tastes of addressees.

In addition, according to the embodiment of the invention, the pictorial tone changing attributes can be set by region in the address book, whereby the original image can be set to pictorial tones matching the characteristics of regions where addressees reside.

Further, according to the embodiment of the invention, the pictorial tone changing attributes can be set by relation with addressees in the address book such as relations of the user with personal friends, colleagues in the company to which the user belongs and relatives, whereby the original image can be set to images associated with the relations of the user.

In addition, according to the embodiment of the invention, even when a plurality of post cards are printed, the pictorial tone of the original image can be changed automatically in association with addressees, whereby the sorting work of post cards in association with addressees can be mitigated.

Additionally, the operations described in the embodiment can be written on a recording medium such as a magnetic disk, an optical disk or a semiconductor memory, for example, for application to various types of equipment or can be transmitted through a transmission medium for application to various types of equipment as the image printing program which can be realized on a computer. By executing the image printing program which executes the respective operations described in the embodiment on other electronic equipment, the same function and advantage can be obtained as those provided when the invention is applied to the image printer 1 as is described above. The computer is not limited to the computer incorporated in the image printer 1 but includes computers which are incorporated in every type of electronic equipment which includes an operating unit such as a CPU which can read an image printing program like the one described heretofore and which executes controlling operations in the program so read.

While the embodiment of the invention has been described heretofore, the embodiment is given to represent one example of the invention and is not intended to limit the scope of the invention. This novel embodiment can be carried out in various forms, and hence, various omissions, replacements and modifications can be made to the embodiment without departing from the spirit and scope of the invention. The embodiment and variations thereof are to be incorporated in the spirit and scope of the invention and also incorporated in inventions that will be described in claims and equivalents thereof.

What is claimed is:

1. An image printer comprising:
  an original image storage unit which stores data of an original image;
  an address book storage unit which stores addressees data including names and addresses of addressees;
  an attribute setting unit which sets a pictorial tone changing attribute for each of the addressees data which changes the data of the original image to a designated tone;
  an addressees data selection unit which selects one addressee data to be printed from the addressees data;
  a pictorial tone changing unit which changes the data of the original image to image data having the designated tone based on the pictorial tone changing attribute set for the addressee data by the attribute setting unit;
  a printing unit which executes a printing operation of printing the addressee data and the image data having the designated pictorial tone; and
  a control unit which, in response to an addressee printing instruction to print the selected addressee data, (a) makes the printing unit execute a printing operation of printing the addressee data on a first area of printing media, and (b) makes the printing unit execute a printing operation of printing the changed image data having the designated pictorial tone on a second area of the printing media;
  wherein the attribute setting unit sets the pictorial tone changing attribute by each of relations in the addressees data which includes at least one of personal friends, colleagues in a company and relatives.

2. The image printer as set forth in claim 1, wherein the pictorial tone changing attribute includes at least one of an oil painting tone, a watercolor tone, a pastel painting tone and a color pencil drawing tone.

3. The image printer as set forth in claim 1, wherein the attribute setting unit is further configured to set the pictorial tone changing attribute by region in the addressees data.

4. The image printer as set forth in claim 2, wherein the attribute setting unit is further configured to set the pictorial tone changing attribute by region in the addressees data.

5. The image printer as set forth in claim 1, further comprising a continuous printing attribute storage device, wherein the continuous printing attribute storage device stores the pictorial tone changing attribute associated with the pictorial tone image based on the addressee data in a printing order of printing the addressee data, when the addressee data is printed on the first area of the printing media.

6. The image printer as set forth in claim 2, further comprising a continuous printing attribute storage device, wherein the continuous printing attribute storage device stores the pictorial tone changing attribute associated with the pictorial tone image based on the addressee data in a printing order of printing the addressee data, when the addressee data is printed on the first area of the printing media.

7. An image printing method to be executed by an image printer, the method comprising:
  storing data of an original image in an original image storage unit;
  storing addressees data including names and addresses of addressees in an address book storage unit;
  setting a pictorial tone changing attribute for each of the addressees data which changes the data of the original image to a designated tone;
  selecting one addressee data to be printed from the addressees data;
  changing the data of the original image to image data having the designated tone based on the pictorial tone changing attribute set for the addressee data by the attribute setting unit;
  executing a printing operation of printing the addressee data and the image data having the designated pictorial tone; and
  in response to an addressee printing instruction to print the selected addressee data, (a) executing a printing operation of printing the addressee data on a first area of printing media, and (b) executing a printing operation of printing the changed image data having the designated pictorial tone on a second area of the printing media;
  wherein the setting the pictorial tone changing attribute is performed by each of relations in the addressees data which includes at least one of personal friends, colleagues in a company and relatives.

8. The image printing method as set forth in claim 7, wherein the pictorial tone changing attribute includes at least one of an oil painting tone, a watercolor tone, a pastel painting tone and a color pencil drawing tone.

9. The image printing method as set forth in claim 7, wherein the setting the pictorial tone changing attribute is further performable by region in the addressees data.

10. The image printing method as set forth in claim 8, wherein the setting the pictorial tone changing attribute is further performable by region in the addressees data.

11. The image printing method as set forth in claim 7, further comprising storing the pictorial tone changing attribute associated with the pictorial tone image based on the addressee data in a printing order of printing the addressee data, when the addressee data is printed on the first area of the printing media.

12. A non-transitory computer-readable recording medium with an executable image printing program stored thereon, wherein the image printing program is executable to control a computer of an image printer to perform functions comprising:

- storing data of an original image in an original image storage unit;
- storing addressees data including names and addresses of addressees in an address book storage unit;
- setting a pictorial tone changing attribute for each of the addressees data which changes the data of the original image to a designated tone;
- selecting one addressee data to be printed from the addressees data;
- changing the data of the original image to image data having the designated tone based on the pictorial tone changing attribute set for the addressee data by the attribute setting unit;
- executing a printing operation of printing the addressee data and the image data having the designated pictorial tone; and
- in response to an addressee printing instruction to print the selected addressee data, (a) executing a printing operation of printing the addressee data on a first area of printing media, and (b) executing a printing operation of printing the changed image data having the designated pictorial tone on a second area of the printing media;

wherein the setting the pictorial tone changing attribute is performed by each of relations in the addressees data which includes at least one of personal friends, colleagues in a company and relatives.

13. The non-transitory computer-readable recording medium as set forth in claim 12, wherein the pictorial tone changing attribute includes at least one of an oil painting tone, a watercolor tone, a pastel painting tone and a color pencil drawing tone.

14. The non-transitory computer-readable recording medium as set forth in claim 12, wherein the setting the pictorial tone changing attribute can further be performed by region in the addressees data.

15. The non-transitory computer-readable recording medium as set forth in claim 13, wherein the setting the pictorial tone changing attribute can further be performed by region in the addressees data.

16. The non-transitory computer-readable recording medium as set forth in claim 12, wherein the program is executable to control the computer to perform a further function of storing the pictorial tone changing attribute associated with the pictorial tone image based on the addressee data in a printing order of printing the addressee data, when the addressee data is printed on the first area of the printing media.

* * * * *